United States Patent
Pfeffer

(10) Patent No.: US 6,811,649 B2
(45) Date of Patent: Nov. 2, 2004

(54) LINE FACED MARINE INSULATION, AND METHOD OF PRODUCTION

(75) Inventor: Jack R. Pfeffer, Eagle, ID (US)

(73) Assignee: UPF Corporation, Bakersfield, CA (US)

(*) Notice: Subject to any disclaimer, the term of this patent is extended or adjusted under 35 U.S.C. 154(b) by 14 days.

(21) Appl. No.: 10/165,718

(22) Filed: Jun. 8, 2002

(65) Prior Publication Data

US 2003/0228820 A1 Dec. 11, 2003

(51) Int. Cl.[7] .................................................. C09J 5/02
(52) U.S. Cl. ................... 156/307.3; 156/62.8; 156/324; 264/113; 264/258
(58) Field of Search ................................ 156/62.2, 276, 156/279, 307.7, 62.8, 307.3, 307.4, 307.1, 324; 264/113, 258

(56) References Cited

U.S. PATENT DOCUMENTS

| | | | |
|---|---|---|---|
| 2,676,898 A | * | 4/1954 | Folger et al. ............... 428/221 |
| 2,744,044 A | * | 5/1956 | Toulmin, Jr. ............... 442/268 |
| 3,769,131 A | * | 10/1973 | Genson ...................... 156/283 |
| 5,018,220 A | | 5/1991 | Lane et al. |
| 5,284,700 A | | 2/1994 | Strauss et al. |
| 5,389,121 A | | 2/1995 | Pfeffer |
| 5,472,467 A | | 12/1995 | Pfeffer |
| 5,527,587 A | | 6/1996 | Bahm |
| 5,985,411 A | | 11/1999 | Pfeffer |

FOREIGN PATENT DOCUMENTS

FR 2 409 855 11/1977

OTHER PUBLICATIONS

Dictionary.com definition of fabric.*

* cited by examiner

Primary Examiner—Blaine Copenheaver
Assistant Examiner—John L. Goff
(74) Attorney, Agent, or Firm—William W. Haefliger

(57) ABSTRACT

A method of producing a lightweight heat resistant and insulative composite sheet, and containing glass fibers, consisting essentially of homogenized glass fiber and binder materials forming a first layer, binder material extending in a second layer on a surface of the first layer and bonded thereto, woven glass fiber facing cloth extending in a third layer on a surface of the second layer and bonded thereto so that the second layer is sandwiched between the first and third layers, binder material in all layers being cured, to integrate the layers.

17 Claims, 3 Drawing Sheets

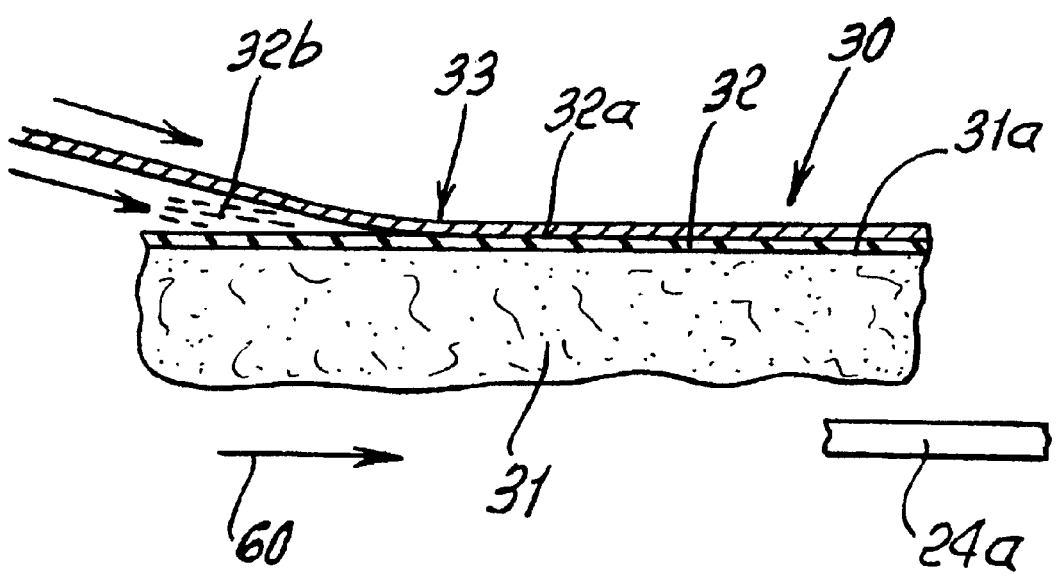
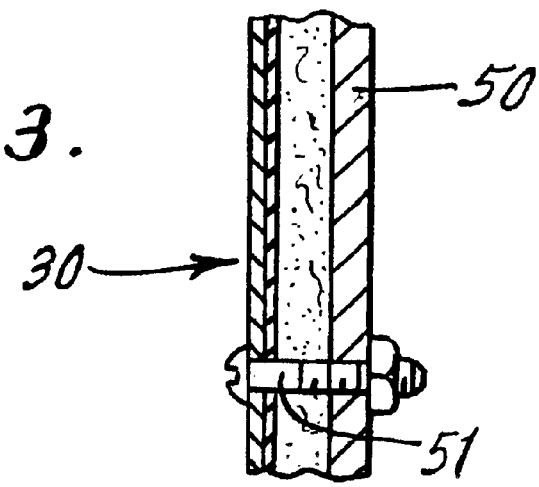

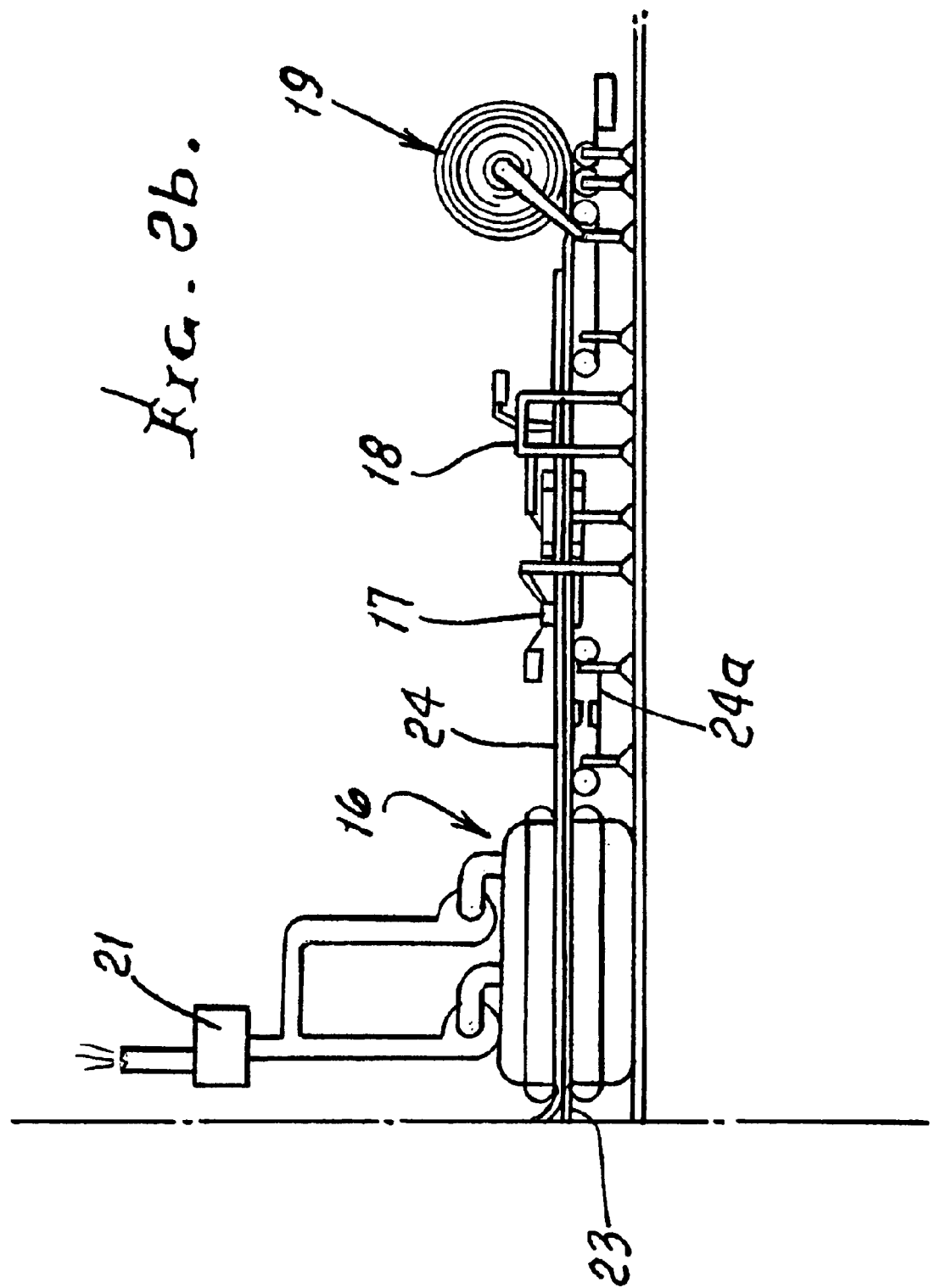

LINE FACED MARINE INSULATION, AND METHOD OF PRODUCTION

BACKGROUND OF THE INVENTION

This invention relates generally to formed and forming of faced, marine or other transportation, heat resistant insulation; and more particularly to a lightweight, sturdy, protective and insulative board product.

There is need for lightweight board-like products as referred to, and particularly in marine environments, as for example on ships. Prior glass fiber board products were objectionable due to production of itching or irritation of users, and to their intrinsic weight, which requires a mode costly installation. There is need for glass fiber content protective facing board products that will not produce objectionable itching, and for products having the highly advantageous features of construction, functions and results provided by the methods disclosed herein.

SUMMARY OF THE INVENTION

It is a major object to provide an improved board product with glass fiber content, that meets the above need and overcomes prior problems. Basically, the board product of the invention is a lightweight, insulative, composite sheet consisting essentially of, or combining, a) homogenized glass fiber and binder materials forming a first layer, b) binder material extending in a second layer on a surface of the first layer and bonded thereto, c) woven glass fiber facing cloth extending in a third layer on a surface of the second layer and bonded thereto so that the second layer is sandwiched between the first and third layers, d) the binder material being cured to integrate the product.

As will be seen, the first layer is provided to have a wool-like composition; and the second layer binder resin typically has a sprayed-on, and cured in situ, configuration on the surface of the wool-like first layer. Also, the first layer typically and preferably consists of about 80% by weight of glass fibers, and about 20% by weight of binder resin, the combination of these materials being homogenized. The third layer woven cloth has a binder content of less than about 10%, and is adherent to a surface of the second layer, whereby the second layer is sandwiched between the first and third layers. The binder resin typically consists of Phenol Formaldehyde; and the glass fibers in the first layer are typically between 1 and 2 microns in length, and surrounded by binder resin in the wool-like, cured state of the first layer.

The basic method of the invention includes:

i) forming a composite, three layer laminated sheet as defined above, ii) and drying and curing to composite sheet, at elevated temperature, as for example between 425° and 475° F.

As will be seen, the facing cloth layer is preferably applied onto the surface of the sprayed-on binder layer just prior to step ii) referred to above, to achieve optimum strength of the cured product.

These and other objects and advantages of the invention, as well as the details of an illustrative embodiment, will be more fully understood from the following specification and drawings, in which:

DRAWING DESCRIPTION

FIG. 1 is an enlarged sectional view showing formation of a preferred composite sheet or board, and the resultant product;

FIGS. 2a and 2b are an elevation showing further details of product formation; FIG. 2b being a continuation of 2a; and FIG. 3 is an elevation showing application of the formed protective sheet or board to marine structure, to protect same.

DETAILED DESCRIPTION

Figure 2A:
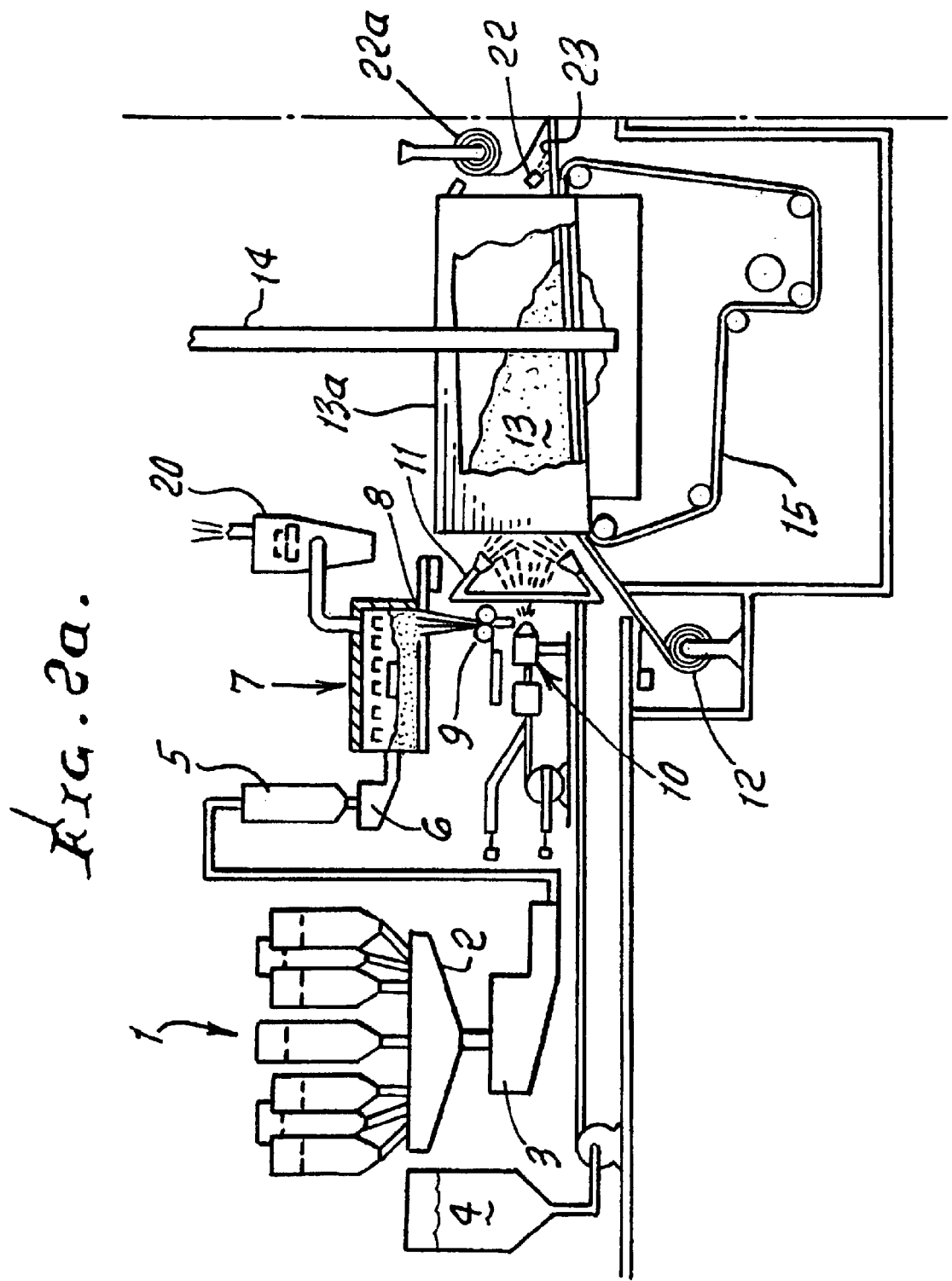

Referring first to FIG. 1, the lightweight, insulative, composite sheet or board, containing glass fibers, and in formed condition, is shown at 30. It includes:

a) homogenized glass fiber and binder materials forming a first layer 31;

b) binder material, i.e. resin, extending in a second layer 32, on the surface 31a of the first layer, and bonded to that surface; surface 31a typically being irregular; and c) woven glass fiber facing cloth extending in a third layer 33 on a surface 32a of the second layer, and bonded to that surface. As a result, second layer 32 is sandwiched between the first and third layers 31 and 33, and firmly attaches 31 to 33.

The first layer 31 typically has a wool-like composition, and has a density of between 0.5 and 4.0 (and preferably about 0.75) pounds per cubic foot of layer 31. The overall thickness of sheet or board 30 is between 0.75 and 1.25 inches and preferably about 1.0 inch. First layer 31 preferably consists of about 80% by weight of glass fibers, and about 20% by weight of binder resin, the fibers and resin being homogenized whereby the fibers are thoroughly dispersed in and individually covered by the binder resin, and uniformly dispersed in layer 31. The bulk of (and preferably about all of) the glass fibers in layer 31 have diameter between about 1 and 2 microns.

The second layer binder 32 typically has a sprayed-on and cured in situ configuration. Spray-on assures binder penetration in and at the surface of layer 31. Numeral 35 in FIG. 1 indicates spray-on of binder 32b onto surface 31a of layer 31, as layer 31 is transported lengthwise as on conveyor 24a in FIG. 2. See arrow 60 in FIG. 1.

The facer cloth layer 33 typically has a binder content of less than 10% by weight. Such binder content is impregnated in the cloth, whereby curing of the composite sheet cures the binder in layer 33 and the latter becomes firmly bonded to 100% binder layer 32 which in turn firmly bonds to layer 31. Facer cloth layer 33 has weight between 20 and 60 grams per square foot.

The elevated curing temperature is typically between 425° F., for binder resin consisting of Phenol Formaldehyde, Melamine and other thermal/set resins. Drying and curing at such elevated temperature or temperatures is completed during a time interval between 2 and 4 minutes. The sheet 30 is preferably traveled endwise through a curing oven, for that purpose, and thereafter the sheet is slit into strips as required. See FIG. 2. The facer cloth layer 33 is preferably fed or traveled progressively and endwise onto the sprayed-on binder layer 32 just prior to entry of the composite assembly into the curing oven.

FIG. 2 shows the complete, flame attenuation process, with numerals 1–22 applied to elements or steps of the process. Such numerals identify the following:

1. holding tanks for batch glass ingredients
2. batch weighing and mixing apparatus (computer controlled)
3. batch transport apparatus
4. binder resin tank 5. batch holding tank, proximate furnace
6. apparatus to feed batch ingredients from tank 5 to furnace 7
7. furnace operated at or near 2450° F.
8. bushings through which molten glass flows from furnace, at about 1750° F. Bushings typically consist of platinum and rhodium
9. rolls to pull glass through bushings, to produce fibers
10. burners, for producing hot gas jets to melt the fibers, to attenuate them into finer fibers displaced or blown rightwardly (see U.S. Pat. No. 5,389,121) to mix with binder, sprayed at 11.
11. binder spray nozzles receiving binder pumped from 4
12. CEREX (glass) web backer roll, feeding backer sheet to travel rightwardly on chain conveyor 15, within enclosure 13a, to support the homogenized (mixed) glass fibers and binder resin, collecting at 13.
13. homogenized mix collection
14. forming fans
15. chain conveyor
16. curing oven through which formed layers travel (see layers 31, 32 and 33 in FIG. 1)
17. slitters, to slit cured product into strips
18. choppers to cut strips to selected length
19. roll-up roll, for roll-up of product
20. furnace air pollution control and treating apparatus
21. oven gas pollution control and treating apparatus
22. over-spray nozzles to spray binder layer 32 onto surface of homogenized layer 31 (see FIG. 1)
22a. supply roll to feed woven glass facer layer onto sprayed-on binder layer (see FIG. 1)
23. binder over-spray layer
24. finished, faced product traveling on conveyor 24a, toward slitters 17

FIG. 3 shows application of the board 30 to marine panel or support structure 50, which may be metallic, as by bolting at 51, to protect 50.

I claim:

1. A method of providing a lightweight heat resistant and insulative composite product sheet, containing glass fibers, the method consisting of the steps:
    a) providing homogenized glass fiber and binder materials forming a first layer,
    b) providing binder material extending in a second layer on a surface of the first layer and bonded thereto,
    c) providing woven glass fiber facing cloth extending in a third layer on a surface of the second layer and bonded thereto so that the second layer is sandwiched between the first and third layers, said third layer cloth having binder content impregnated in the cloth and being less than 10% by weight of the cloth,
    d) binder material in all layers being cured, to integrate the layers whereby binder impregnated in the cloth is bonded to said second layer binder,
    e) said third layer cloth having weight between 20 and 60 grams per square foot.

2. The method of claim 1 wherein the first layer is provided to have a wool-like composition.

3. The method of claim 1 wherein the first layer is provided to have a density of about ¾ pound per sheet cubic foot, the sheet being about 1.0 inch thick, said product sheet having from 0.375 to 4 inch thickness and from 0.5 to 4.0 pounds per cubic foot density.

4. The method of claim 1 wherein said second layer binder is provided to have a sprayed on and cured in situ configuration on said surface of the first layer, which is irregular.

5. The method of claim 1 wherein the bulk of the glass fibers in said first layer is provided to have diameter between 1 and 2 microns.

6. The method of claim 1 wherein the first layer is provided to consist of about 80% by weight of glass fibers and about 20% by weight of binder, said fibers and binder being homogenized.

7. The method of claim 1 wherein said first layer is provided to have a wool-like consistency, and a density between 0.5 and 4.0 pounds per cubic foot.

8. The method of claim 7 wherein said density is about 0.75 pounds per cubic foot.

9. The method which comprises:
    i) forming a composite sheet as defined in claim 1,
    ii) and then drying and curing said sheet, at elevated temperature, while being transported.

10. The method of claim 9 wherein said elevated temperature is between 425° F. and 475° F.

11. The method of claim 9 wherein said drying and curing at elevated temperature is completed during a time interval between 2 and 4 minutes.

12. The method of claim 9 including spraying said binder onto an irregular upper surface of said first layer.

13. The method of claim 12 including progressively feeding said facing cloth onto said sprayed on binder layer just prior to said step ii) of claim 11.

14. The method of claim 1 wherein the composite sheet has density of from 0.5 to 4.0 pounds per cubic foot.

15. The method of claim 1, wherein the composite sheet is between 0.25 and 4.0 inches thick.

16. The method of claim 9 wherein the binder consists of synthetic resin.

17. The method of claim 16 wherein the resin consists of phenol formaldehyde.

* * * * *